(12) United States Patent
Matsunobu et al.

(10) Patent No.: US 8,302,215 B2
(45) Date of Patent: Nov. 6, 2012

(54) GLOVE AND MANUFACTURING METHOD THEREOF

(75) Inventors: Kazutaka Matsunobu, Kurume (JP); Nobuyoshi Koga, Kurume (JP); Yukiko Tsuchimochi, Kurume (JP)

(73) Assignee: Towa Corporation Ltd., Fukuoka (JP)

( * ) Notice: Subject to any disclaimer, the term of this patent is extended or adjusted under 35 U.S.C. 154(b) by 102 days.

(21) Appl. No.: 12/866,176

(22) PCT Filed: Feb. 10, 2009

(86) PCT No.: PCT/JP2009/052237
§ 371 (c)(1),
(2), (4) Date: Aug. 4, 2010

(87) PCT Pub. No.: WO2009/101943
PCT Pub. Date: Aug. 20, 2009

(65) Prior Publication Data
US 2010/0325779 A1   Dec. 30, 2010

(30) Foreign Application Priority Data
Feb. 15, 2008 (JP) .................................. 2008-034993

(51) Int. Cl.
*A41D 19/00* (2006.01)
(52) U.S. Cl. ............................................ 2/161.6; 2/169
(58) Field of Classification Search .................. 2/161.6, 2/161.1, 161.8, 169
See application file for complete search history.

(56) References Cited

U.S. PATENT DOCUMENTS

| 3,945,049 A * | 3/1976 | Barlow ............................... 2/169 |
| 4,089,069 A * | 5/1978 | Vistins ............................ 2/161.8 |
| 5,822,791 A * | 10/1998 | Baris ................................... 2/2.5 |
| 6,044,493 A * | 4/2000 | Post ................................... 2/167 |
| 7,814,570 B2 * | 10/2010 | Hassan et al. ................... 2/161.1 |

FOREIGN PATENT DOCUMENTS

| JP | 61-275407 | 12/1986 |
| JP | 2540729 | 7/1996 |

\* cited by examiner

*Primary Examiner* — Danny Worrell
(74) *Attorney, Agent, or Firm* — Jordan and Hamburg LLP

(57) ABSTRACT

A glove which can ensure flexibility thereof and can prevent peeling-off of a resin film formed on a surface of a glove base body is provided. Also provided is a manufacturing method of the glove. The glove (G) includes a glove base body (1) constituted of a knitted glove, a first resin film layer (2) formed on a surface of the glove base body (1), and a second resin film layer (3) formed on the first resin film layer (2). The first resin film layer (2) and the second resin film layer (3) cover a palm portion and side portions of the glove base body (1), a palm side and side parts of respective fingers, and areas ranging from fingertip portions to a back portion of the glove base body (1) including the fingertip portions. An uncovered back portion (4) where a resin film layer is not present is formed on a remaining portion of the back portion. The second resin film layer (3) is formed on the first resin film layer (2) in an overlapping manner. A peripheral portion (31) of the second resin film layer (3) extends beyond a peripheral portion (21) of the first resin film layer (2) and is brought into direct contact with the glove base body (1), and the resin liquid in contact with the glove base body (1) permeates into the inside of the glove base body (1) and forms a peeling-off preventing portion.

7 Claims, 4 Drawing Sheets

GLOVE AND MANUFACTURING METHOD THEREOF

TECHNICAL FIELD

The present invention relates to a glove and a manufacturing method thereof, and more particularly to a glove which can ensure flexibility thereof and can prevent the peeling-off of a resin film formed on a surface of a fibrous glove base body (hereinafter, referred to as "glove base body"), and a manufacturing method of the glove.

BACKGROUND OF THE INVENTION

In a glove which forms a resin film on a surface of a glove base body, there have been manufactured many kinds of gloves which can prevent the inside thereof from easily getting stuffy even when the glove is used for a long time by providing a portion where a resin film is not formed to a back side of the glove. In such a glove, from a viewpoint of durability, adhesive strength between the resin film and the glove base body is important.

To enhance the adhesive strength of the resin film, for example, there has been known a technique which adjusts the degree of permeation of the resin film into the glove base body or a technique which uses an adhesive agent.

When a resin permeates into the glove base body more deeply, the adhesive strength between the resin film and the glove base body is increased and hence, it is possible to prevent the resin film from peeling off thus enhancing the durability of the glove. However, such a glove lacks in flexibility so that the glove exhibits the hard texture.

On the other hand, when the resin is not permeated into the glove base body deeply, the glove possesses flexibility so that the glove exhibits soft texture. However, the adhesive strength between the resin and the glove base body is decreased thus deteriorating the durability of the glove.

Usually, with respect to the peeling-off of the resin film from the glove base body, in many cases, once a peripheral portion of the resin film, that is, an immersion boundary portion between a resin and the glove base body is peeled off, the peeling-off of the whole resin film is accelerated. Accordingly, it is particularly important to increase the adhesive strength of the immersion boundary portion. However, it is difficult to prevent the peeling-off of the resin film by merely increasing the adhesive strength of such a portion.

To cope with such a situation, patent document 1 discloses a working glove which can ensure flexibility and an adhesive strength against peeling-off of a resin film as follows. A permeation agent is applied to an immersion boundary portion of a glove base body which is positioned at a liquid level of a raw material liquid to which a liquid pressure of a raw material liquid is hardly applied, and a water-repellent agent is applied to a portion of the glove base body positioned below the liquid level to which the liquid pressure of the raw material liquid is applied. Due to such an operation, the adhesiveness of a resin film to a portion of the glove base body positioned below the liquid level is decreased, while the adhesiveness of the resin film to the immersion boundary portion of the glove base body is increased.

Patent document 1: Patent Publication No. 2540729

DISCLOSURE OF THE INVENTION

Task to be Solved by the Invention

However, in a case of the glove described in patent document 1, it is necessary to apply a water-repellent agent and a permeation agent to the immersion boundary line between the glove base body and the resin by spraying and hence, there arises a drawback that the number of operational steps is increased. Further, the spraying of the water-repellent agent and the permeation agent only to the immersion boundary line is difficult.

Inventors of the present invention have made extensive studies on techniques which allow a glove to ensure flexibility and can prevent the peeling-off of a resin film which is formed on a surface of a glove base body and have focused on the importance of increasing the peeling-off strength mainly at a peripheral portion of the resin film. As a solution which realizes the increase of peeling-off strength, the inventors of the present invention have made a finding that the changing of the degree of permeation of a resin film into the glove base body is particularly effective, and have completed the present invention.

Object of the Present Invention

That is, it is an object of the present invention to provide a glove which can ensure flexibility of the glove per se and can prevent the peeling-off of a resin film formed on a surface of a glove base body and a manufacturing method of the glove.

Means for Solving the Task

Means which are taken by the present invention to solve the above-mentioned task are as follows.

The present invention is directed to a glove in which a resin film is formed on a palm side of a fibrous glove base body and the glove has a portion where the resin film is not formed on a back side of the fibrous glove base body, wherein the glove includes resin film layers at least in two layers consisting of: a first resin film layer which is formed on the fibrous glove base body; and a second resin film layer which is formed on the first resin film layer in an overlapping manner and has a peripheral portion thereof extended beyond a peripheral portion of the first resin film layer and formed on the fibrous glove base body, the peripheral portion of the second resin film layer includes a peeling-off preventing portion which is formed using a resin which permeates into the inside of the fibrous glove base body, and a resin which is used for forming the first resin film layer permeates into the fibrous glove base body in smaller quantity compared to the resin used for forming the peeling-off preventing portion.

In the above-mentioned glove, the peeling-off preventing portion may be formed over the whole circumference of the peripheral portion of the second resin film layer or on a desired portion of the peripheral portion of the second resin film layer.

The present invention is also directed to a glove in which a resin film is formed on a palm side of a fibrous glove base body and the glove has a portion where the resin film is not formed on a back side of the fibrous glove base body, wherein the glove includes one or a plurality of resin film layers which are formed on the fibrous glove base body and an uppermost resin film layer which is formed on the resin film layers in a stacked manner and has a peripheral portion thereof extended beyond a peripheral portion of one or plurality of resin film layers and formed on the fibrous glove base body, and the peripheral portion of the uppermost resin film layer includes a peeling-off preventing portion which is formed using a resin which permeates into the inside of the fibrous glove base body.

In the above-mentioned glove, the peeling-off preventing portion may be formed over the whole circumference of the peripheral portion of the uppermost resin film layer or on a desired portion of the peripheral portion of the uppermost resin film layer.

In the above-mentioned glove, a resin film layer may be formed on the second resin film layer or on the uppermost resin film layer.

The present invention is directed to a manufacturing method of a glove in which a resin film is formed on a palm side of a fibrous glove base body and the glove has a portion where the resin film is not formed on a back side of the fibrous glove base body, the manufacturing method including the steps of: forming a first resin film layer on the fibrous glove base body; and forming a second resin film layer at least in one layer on the first resin film layer, wherein in the step of forming the second resin film layer, the fibrous glove base body is immersed into a resin liquid such that a peripheral portion of the second resin film layer extends beyond a peripheral portion of the first resin film layer and is brought into direct contact with the fibrous glove base body, and the resin liquid which is brought into direct contact with the fibrous glove base body by immersion permeates into the inside of the fibrous glove base body and forms a peeling-off preventing portion.

In the above-mentioned manufacturing method of a glove, in the step of forming the second resin film layer, it is preferable that drying of a coagulation liquid for forming the second resin film layer progresses faster than in the step of forming the first resin film layer or the resin liquid which permeates into the fibrous glove base body more easily than a resin liquid for forming the first resin film layer is used.

The present invention is directed to a manufacturing method of a glove in which a resin film is formed on a palm side, of a fibrous glove base body and the glove has a portion where the resin film is not formed on a back side of the fibrous glove base body, the manufacturing method including the steps of: forming one or a plurality of resin film layers on the fibrous glove base body; and forming an uppermost resin film layer on one or plurality of resin film layers in a stacked manner such that a peripheral portion of the uppermost resin film layer extends beyond a peripheral portion of one or plurality of resin film layers and is formed on the fibrous glove base body, wherein in the step of forming the uppermost resin film layer, the fibrous glove base body is immersed in a resin liquid such that the peripheral portion of the uppermost resin film layer extends beyond the peripheral portion of one or plurality of resin film layers and is brought into direct contact with the fibrous glove base body, and the resin liquid which is brought into contact with the fibrous glove base body by immersion permeates into the inside of the fibrous glove base body thus forming a peeling-off preventing portion.

In the above-mentioned manufacturing method of a glove, in the step of forming the uppermost resin film layer, it is preferable that drying of a coagulation liquid for forming the uppermost resin film layer progresses faster than in the step of forming one or a plurality of resin film layers or the resin liquid which permeates into the fibrous glove base body more easily than a resin liquid for forming one or plurality of resin film layers is used.

The term "permeate" used in this specification and Claims is used in a context that the term implies a resin infiltrates the weave texture, the knitted texture or the fibers of the globe base body.

Further, the term "resin liquid" used in this specification and Claims is used in a context that the term implies a liquid resin composition in which composition components of a resin film are mixed with each other.

As a material of the glove base body used in the present invention, usually, a knitted fabric or a woven fabric formed of natural fibers, synthetic fibers or the mixture of natural fibers and synthetic fibers or the like can be preferably used.

As the resin used for forming the resin film layer of the present invention, an existing material such as natural rubber, acrylonitrile-butadiene rubber, chloroprene rubber, polyvinyl chloride or polyurethane can be used.

As a blending agent for the resin liquid, a stabilizer, a cross-linking agent, a cross-linking disperser, an antioxidant, a thickening agent, a plasticizer, a defoaming agent or the like can be used. The use of these materials can be suitably adjusted depending on a usage of a glove. The stabilizer has a function of increasing mechanical and chemical stability of a latex resin liquid, and influences the degree of permeation of the resin into the glove base body depending on an amount and a kind of the latex resin liquid.

Further, the cross-linking disperser can be obtained by dispersing, besides a cross-linking agent such as sulfur or peroxide, a solid material such as a cross-linking accelerator such as BZ, TT, CZ and PZ, a cross-linking acceleration assistant such as zinc white or an antioxidant into water. The cross-linking disperser may be mainly used when the resin liquid is formed of rubber latex. With the use of the cross-linking disperser, rubber molecules are bonded in a meshed shape thus enhancing physical properties such as strength of a resin film.

As a method of forming a resin film from a resin liquid, a salt coagulation method, a heat-sensitive coagulation method, a straight method or the like can be named. The salt coagulation method is a method in which a resin liquid is formed into gel using a salt. The heat-sensitive coagulation method is a method in which a temperature-sensitive agent is preliminarily added to a resin liquid and the resin liquid is formed into gel corresponding to a temperature. The straight method is a method in which a resin liquid is formed into gel by drying without using a coagulating agent or a heat-sensitive agent.

As a coagulating agent used in the salt coagulation method, usually, a metal salt such as calcium nitrate or calcium chloride is used, and the coagulating agent is dissolved in a solvent such as methanol or water and is used as a coagulating liquid.

The degree of permeation of a resin into a glove base body differs between before and after drying a coagulating liquid. Before drying the coagulating liquid, that is, in a case where the coagulating liquid is sufficiently impregnated into the glove base body in a liquid state, when the glove base body is immersed into a resin liquid, the resin liquid is immediately solidified so that the degree of permeation of the resin into the glove base body is small, that is, the resin liquid does not deeply permeate into the glove base body. To the contrary, after drying the coagulating liquid, that is, in a case where the coagulating liquid is no more in a liquid state, when the glove base body is immersed into a resin liquid, the resin liquid is not immediately solidified so that the degree of permeation of the resin into the glove base body is large, that is, the resin liquid deeply permeates into the glove base body. Accordingly, the degree of permeation of resin liquid differs depending on the degree of drying of the coagulating liquid.

The reason of this mechanism is not exactly clarified. However, it is thought that such a phenomenon takes place due to the following reason. That is, when the coagulating liquid is in a liquid state and is sufficiently impregnated into the glove base body, the coagulating liquid, that is, a coagulating agent dissolved in a solvent reaches every corner of the glove base body such as knitted stitches, woven stitches or a space defined between fibers. When the resin liquid is brought into contact with the coagulating agent, the resin liquid is immediately coagulated so that the permeation of the resin liquid into the inside of the glove base body is interrupted whereby the resin liquid is coagulated only at portions of a surface of the glove base body thus forming a resin film with small degree of permeation of resin.

To the contrary, when the coagulating liquid is in a dry state, the solvent is eliminated so that the coagulating agent diffuses in latex. Since it takes a long time until the latex is coagulated, the latex is allowed to permeate into the inside of the glove base body thus forming a resin film with large degree of permeation of resin. Accordingly, the degree of permeation of resin liquid into the glove base body differs depending on the degree of drying of the coagulating liquid.

It is needless to say that, even when the above-mentioned reason is not correct, the completion and the evaluation of the present invention or a scope of patent right executable based on the present invention are not adversely influenced by the reason at all.

With respect to the stabilizer mixed into the resin liquid, there is known a kind of the stabilizer which facilitates the permeation of the resin liquid into the glove base body. By increasing an amount of such a stabilizer, there is observed tendency that the resin liquid permeates into the glove base body more easily. Further, a kind or an amount of a thickening agent mixed into the resin liquid also largely influences the degree of permeation of resin liquid into the glove base body.

Accordingly, it is possible to facilitate the permeation of the resin liquid into the glove base body by increasing a mixing ratio of the stabilizer into the resin liquid or by lowering viscosity of the resin liquid. On the other hand, it is possible to make the permeation of the resin liquid into the glove base body difficult by decreasing the mixing ratio of the stabilizer into the resin liquid or by increasing the viscosity of the resin liquid.

That is, it is possible to change the degree of permeation of the resin liquid into the glove base body by adjusting the composition of the resin liquid so that adhesive strength between the resin film and the glove base body can be adjusted.

(Manufacture of Glove)

The glove according to the present invention is manufactured as follows. Here, symbols used in the explanation hereinafter are given to the respective constitutional elements by making these symbols correspond to symbols given to respective parts in the embodiments described later. However, these symbols are given exclusively for facilitating the understanding of the present invention in the same manner as symbols described in respective claims in Claims and hence, the meaning of the respective constitutional elements is not limited to the above-mentioned respective parts.

Firstly, a glove base body (1) is mounted on a glove manufacturing mold (5). Next, the glove base body (1) is immersed into a coagulating liquid. Then, the glove base body (1) impregnated with the coagulating liquid is immersed into a resin liquid, is taken out from the resin liquid, and is dried thus forming a first resin film layer (2).

After drying the first resin film layer (2), the glove base body (1) is again immersed into the same resin liquid thus forming a second resin film layer (3). In forming the second resin film layer (3), an immersing depth of the glove base body (1) is set larger than an immersing depth of the glove base body (1) in forming the first resin film layer (2).

As a result, the resin liquid is brought into contact with the glove base body (1) by extending beyond a peripheral portion of the first resin film layer (2) so that a peripheral portion of the second resin film layer is directly formed on the glove base body (1).

With respect to the glove base body (1) which is in contact with the deeply permeated resin liquid, the coagulating liquid is also dried at the time of drying the first resin film layer (2) so that a coagulating ability of the coagulating liquid is lowered. Accordingly, the resin liquid permeates into the glove base body (1) more deeply at the time of forming the second resin film layer (3) than at the time of forming the first resin film layer (2) so that in the peripheral portion of the second resin film layer, that is, in a portion of the peripheral portion in the vicinity of an immersion boundary, the resin liquid permeates into the glove base body (1) thus forming a peeling-off preventing portion (32) which exhibits enhanced adhesive strength.

With respect to an immersing depth of the glove base body (1) into the resin liquid for forming the second resin film layer (3) as shown in FIG. 4, it is sufficient that the immersing depth for forming the second resin film layer (3) is larger than an immersing depth for forming the first resin film layer (2). However, when the immersing depth for forming the second resin film layer (3) is excessively deep, the resin which permeates into the inside of the glove base body (1) is brought into contact with a hand and hence, the glove brings a user discomfort and the texture of the glove per se becomes hard. Accordingly, the immersing depth for forming the second resin film layer (3) is preferably set to approximately 1 to 10 mm.

Further, by setting the mixture composition of a first resin liquid for forming the first resin film layer (2) such that the first resin liquid hardly permeates into the glove base body (1) and by setting the mixture composition of a second resin liquid for forming the second resin film layer (2) such that the second resin liquid easily permeates into the glove base body (1) compared to the first resin liquid, in a portion of the glove base body (1) which is immersed more deeply than the first resin film layer (2), the second resin film layer (3) permeates into the glove base body more easily and, in the same manner, in a portion of a peripheral portion of the second resin film layer (3) in the vicinity of the immersion boundary, the resin liquid permeates into the glove base body (1) thus forming a peeling-off preventing portion (32) which exhibits enhanced adhesive strength.

By drying and vulcanizing the resin liquid thereafter, it is possible to acquire a glove which can ensure flexibility of the glove per se and can prevent the peeling-off of the resin film formed on the surface of the glove base body.

Advantage of the Invention

The present invention has the above-mentioned constitution so that the present invention can acquire the following advantages.

(1) According to the glove of the present invention, the glove includes resin film layers at least in two layers consisting of: the first resin film layer which is formed on the glove base body; and the second resin film layer which is formed on the first resin film layer in an overlapping manner and has a peripheral portion thereof extended beyond a peripheral portion of the first resin film layer and formed on the glove base body, and the peripheral portion of the second resin film layer includes the peeling-off preventing portion which is formed using the resin which permeates into the inside of the glove base body. Accordingly, the adhesive strength of the portion in the vicinity of the immersion boundary where the second resin film layer is most liable to be peeled off is enhanced due to the peeling-off preventing portion thus enhancing the durability of the glove.

Further, the resin which is used for forming the first resin film layer permeates into the glove base body in smaller quantity compared to the resin used for forming the peeling-off preventing portion. That is, in the portion other than the immersion boundary, the first resin film layer does not permeate into the glove base body to an extent that the peeling-off portion permeates into the glove base body and hence, the glove exhibits the soft texture as the whole whereby the glove can ensure the flexibility of the glove per se.

Accordingly, the present invention can acquire the glove which can ensure the flexibility of the glove per se and can prevent the peeling-off of the resin film formed on the surface of the glove base body.

(2) Further, according to the manufacturing method of the glove of the present invention, the adhesive strength of the portion in the vicinity of the immersion boundary where the resin film layer is most liable to be peeled off is enhanced due to the peeling-off preventing portion which is formed of the resin which permeates into the inside of the glove base body thus enhancing the durability of the glove. Further, in the portion other than the immersion boundary, the first resin film layer does not permeate into the glove base body to an extent that the peeling-off preventing portion permeates into the glove base body and hence, the glove exhibits the soft texture as the whole whereby the glove can ensure the flexibility of the glove per se.

Accordingly, the present invention can manufacture the glove which can ensure the flexibility of the glove per se and can prevent the peeling-off of the resin film formed on the surface of the glove base body.

In carrying out the above-mentioned manufacturing method, it is possible to omit an operation step in which a water repellant agent and a permeation agent are sprayed to the immersion boundary between the glove base body and the resin.

DESCRIPTION OF THE REFERENCE NUMERALS AND SIGNS

Figure 1:
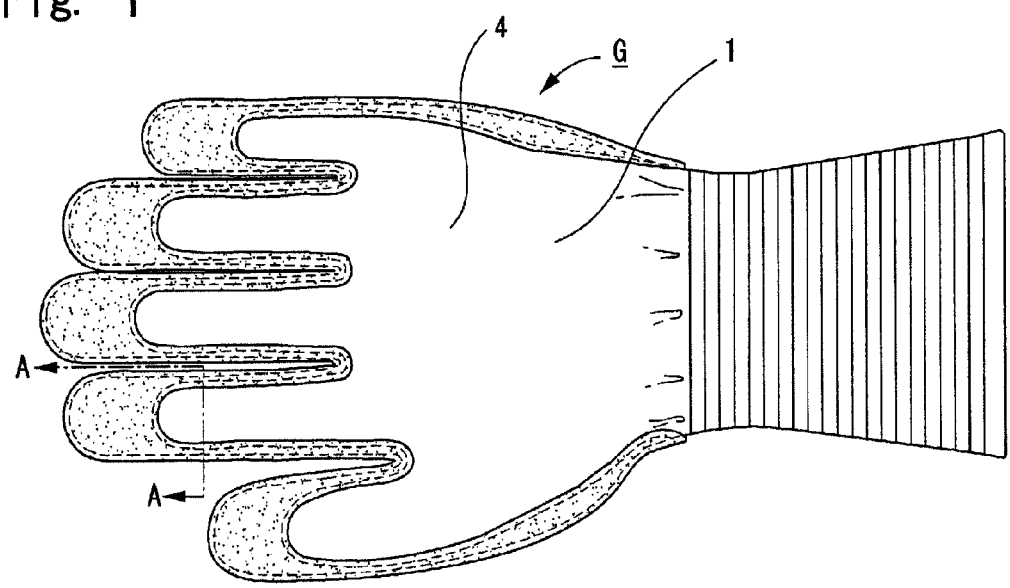
FIG. 1 is an explanatory plan view of a glove according to an embodiment of the present invention as viewed from a back side of the glove.

G, G2, G3: glove
1: glove base body
2, 2a: first resin film
21: peripheral portion
3, 3a: second resin film
31: peripheral portion
32: peeling-off preventing portion
4: uncovered back portion
5: glove manufacturing mold
6: third resin film
61: peripheral portion
62: peeling-off preventing portion
7: third resin film

BEST MODE FOR CARRYING OUT THE INVENTION

Figure 2:
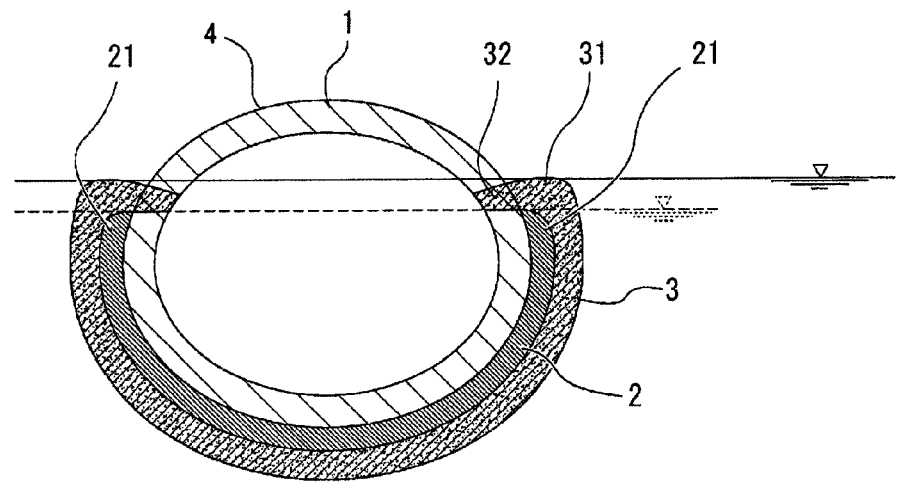
FIG. 2 is an explanatory enlarged cross-sectional view of the glove taken along a line A-A in FIG. 1, and also is an explanatory view showing the glove in an immersed state.
Figure 3:
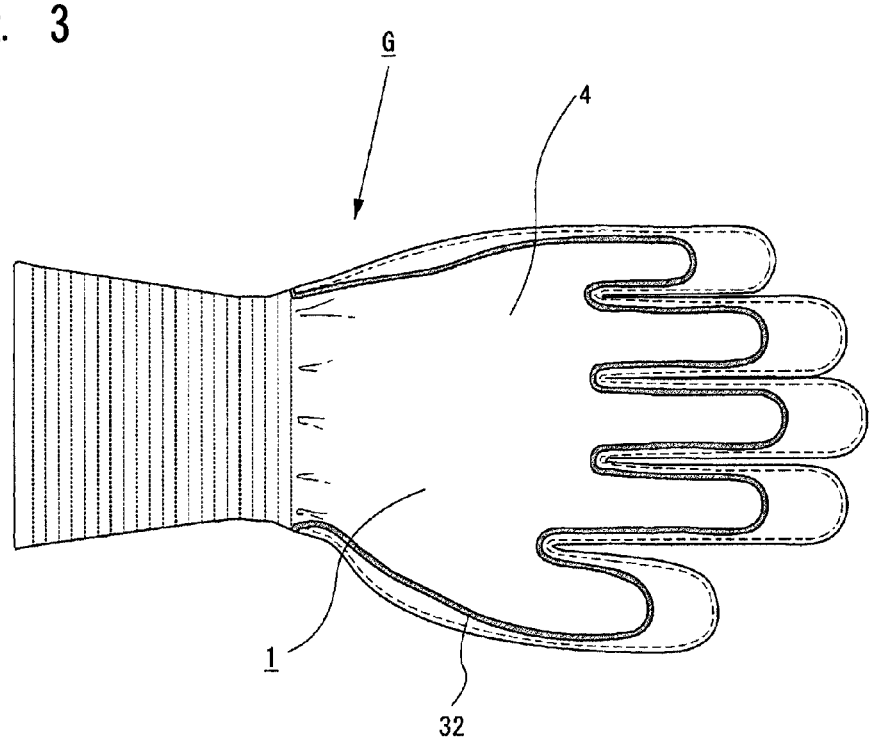
FIG. 3 is an explanatory plan view showing the glove in an up-side-down posture as viewed from a back side of the glove.

FIG. 1 is an explanatory plan view of a glove according to an embodiment of the present invention as viewed from a back side of the glove, FIG. 2 is an explanatory enlarged cross-sectional view of the glove taken along a line A-A in FIG. 1 and also is an explanatory view showing the glove in an immersed state, and FIG. 3 is an explanatory plan view showing the glove in an up-side-down posture as viewed from a back side of the glove. Hereinafter, embodiments of the present invention are explained in detail in conjunction with drawings.

First Embodiment

As shown in FIG. 1 and FIG. 2, a glove G includes a first resin film layer 2 which is formed on a surface of a glove base body 1 formed of a nylon fiber knitted glove, for example, and a second resin film layer 3 which is formed on the first resin film layer 2. As a material of the resin film, an NBR latex resin liquid is used.

The first resin film layer 2 and the second resin film layer 3 cover a palm portion and a side portion of the glove base body 1, a palm portion side and side portions of each finger portion, and a portion ranging from a finger tip portion to a back side of each finger portion while including the finger tip portion. Accordingly, an uncovered back portion 4 where a resin film layer is not formed is formed on a remaining portion on a back side of the glove base body 1. In this embodiment, a resin liquid for forming the first resin film layer 2 and a resin liquid for forming the second resin film layer 3 which have the same mixing ratio are used.

As shown in FIG. 2, in a portion of the glove G where the first resin film layer 2 covers the glove base body 1, a resin liquid does not permeate into the glove base body 1 to an extent that the resin liquid reaches a rear (interior) surface of the glove base body 1. That is, to ensure the flexibility of the glove, the resin liquid is prevented from deeply permeating into the glove base body 1. Due to such a constitution, the resin slightly permeates into the glove base body 1 or the degree of permeation of the first resin film layer 2 into the glove base body 1 is set smaller than the degree of permeation of the second resin film layer into the glove base body 1. Accordingly, although an adhesive strength or a peeling-off strength of the first resin film layer 2 including a peripheral portion 21 with respect to the glove base body 1 is not as strong as an adhesive strength or a peeling-off strength of a peeling-off preventing portion 32 described later, it is possible to ensure the flexibility of the glove per se.

The second resin film layer 3 is formed on the first resin film layer 2 in an overlapping manner and, at the same time, a peripheral portion 31 of the second resin film layer 3 extends beyond the peripheral portion 21 of the first resin film layer and is brought into direct contact with the glove base body 1, and a resin liquid which is brought into contact with the glove base body 1 permeates into the inside of the glove base body 1 thus forming a peeling-off preventing portion 32.

Due to such a constitution, the whole first resin film layer 2 whose adhesive strength or peeling-off strength with respect to the glove base body 1 is not as strong as the corresponding adhesive strength or peeling-off strength of the peeling-off preventing portion 32 is covered with the second resin film layer 3 and, further, the peripheral portion 31 of the second resin film layer 3 extends beyond the peripheral portion 21 of the first resin film layer and is brought into direct contact with the glove base body 1, and the resin liquid permeates into the inside of the glove base body 1 thus forming the peeling-off preventing portion 32. Accordingly, the resin film, as a whole, can ensure a peeling-off strength necessary for preventing the peeling-off of the resin film from the glove base body 1.

Here, in this embodiment, a resin liquid for forming the second resin film layer 3 permeates into the inside of the glove base body 1 and a distal end of the peeling-off preventing portion 32 appears on a rear surface side of the glove base body 1 (see FIG. 2, FIG. 3). However, the degree of permeation of the resin liquid for forming the second resin film layer 3 can be suppressed at a level that the resin liquid does not appear on the rear surface side of the glove base body 1. In such a case, the peeling-off preventing portion 32 does not appear on the rear surface side of the glove base body 1.

In this embodiment, the glove base body 1 is formed of a nylon fiber knitted glove. However, the glove base body 1 is not limited to such a glove, and a knitted glove formed using other fibers and a woven glove are preferably used.

In this embodiment, the first resin film layer 2 and the second resin film layer 3 are formed using the NBR latex resin liquid having the same mixture composition. However, the first resin film layer 2 and the second resin film layer 3 may be formed using NBR latex resin liquids which have different mixture compositions.

(Manner of Operation)

Figure 4:
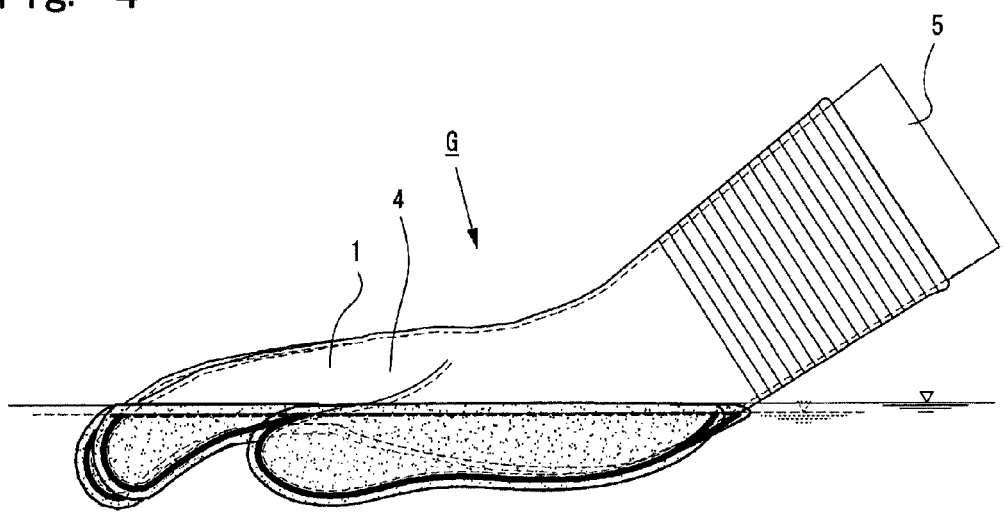
FIG. 4 is an explanatory view showing a state where a glove base body is immersed into a resin liquid while being mounted on a glove manufacturing mold.

FIG. 4 is an explanatory view showing a state where the glove base body is immersed into the resin liquid while being mounted on a glove manufacturing mold. A manufacturing method and the manner of operation of the glove are explained in conjunction with FIG. 1 to FIG. 4.

After mounting the glove base body 1 on the glove manufacturing mold 5, the glove base body 1 is immersed into a coagulating liquid (in this embodiment, 5% of calcium chloride is used as a coagulating agent, and methanol is used as a solvent). Thereafter, the glove base body 1 is taken out from the coagulating liquid and is dried (for 60 sec., for example) and, then, is immersed into the resin liquid thus forming the first resin film layer 2.

With respect to the mixing ratio (in terms of dry weight) of a resin liquid for forming the first resin film layer 2 (being applicable to the second resin film layer 3 in the same manner), 0.2 parts by weight of a stabilizer (ABS), 1 part by weight of sulfur, 3 parts by weight of zinc white, 0.5 parts by weight of a vulcanization accelerator BZ, and 1 part by weight of a thickening agent (sodium polyacrylate) are mixed into 100 parts by weight of NBR latex.

Thereafter, the glove base body 1 immersed into the resin liquid is taken out and is dried for 15 minutes at a temperature of 70° C.

Next, for forming the second resin film layer 3, the glove base body is immersed into a resin liquid which is equal to the resin liquid for forming the first resin film layer 2. Here, as shown in FIG. 2 and FIG. 4, the glove base body is immersed into the resin liquid approximately 5 mm deeper compared to a case where the first resin film layer 2 is formed, that is, the glove base body is immersed into the resin liquid by a depth where the resin liquid is brought into contact with the glove base body (1).

In a portion of the glove base body (1) which is immersed into the resin liquid by a depth where the resin liquid is brought into contact with the glove base body (1), the coagulating liquid is also dried at the time of drying the first resin film layer 2 so that a coagulating ability of the coagulating liquid is lowered and hence, the degree of permeation of the resin liquid into the glove base body (1) at the time of forming the second resin film layer 3 is larger than at the time of forming the first resin film layer 2 so that the resin liquid permeates into the glove base body 1 more deeply, and the permeation of the resin liquid continues until the resin liquid arrives at a rear surface side of the glove base body 1.

After forming the second resin film layer 3, the glove base body 1 is dried and vulcanized for 1 hour at a temperature of 70° C. and for 40 minutes at a temperature of 125° C.

According to the glove acquired by the above-mentioned method, out of two resin film layers, the peripheral portion 31 of the second resin film layer 3 extends beyond the peripheral portion 21 of the first resin film layer 2 and is brought into direct contact with the glove base body 1, and the resin which is brought into contact with the glove base body 1 permeates into the inside of the glove base body 1 thus forming the peeling-off preventing portion 32. Due to the peeling-off preventing portion 32, the peeling-off of the first resin film layer 2 is prevented and hence, the adhesive strength of the portion in the vicinity of the peripheral portion 31 which is the immersion boundary where the resin film layer is most liable to be peeled off is enhanced. As a result, even when the adhesive strength or the peeling-off strength between the glove base body 1 and the first resin film layer 2 is not sufficient compared to the adhesive strength or the peeling-off strength of the peeling-off preventing portion 32, the glove can, as a whole, ensure a peeling-off strength necessary for preventing the peeling-off of the resin film from the glove base body 1.

To the contrary, the resin which is used for forming the first resin film layer 2 does not permeate into the glove base body 1 at a level comparable to the resin which is used for forming the peeling-off preventing portion 32. Accordingly, even when the portion of the glove base body 1 in the vicinity of the peripheral portion 31 which is the immersion boundary exhibits the hard texture, a resin content in the inside of the glove base body 1 which is surrounded by the peripheral portion 31 is small and hence, the glove can maintain the soft texture.

Here, when the resin liquid which is used for forming the peripheral portion 31 of the second resin film layer 3 is allowed to permeate only into the surface layer portion of the glove base body 1, the peeling-off preventing portion 32 does not permeate into a rear surface of the glove base body 1 as shown in FIG. 3 and hence, a resin content of the glove base body 1 can be decreased by an amount corresponding to the non-permeated resin whereby the glove can maintain the softer texture.

The composition of resin liquid of this embodiment is not limited to the above-mentioned composition, and can be suitably changed within the above-mentioned range of composition.

Second Embodiment

Next, a second embodiment of the present invention is explained.

A glove according to the second embodiment has the substantially same structure as the glove according to the first embodiment except for a point that a first resin film layer 2 and a second resin film layer 3 are formed using resin liquids having different mixing ratios and hence, the explanation of the structure of the glove according to the second embodiment is omitted. Further, also with respect to a manufacturing method of the glove, manufacturing steps up to the formation of the first resin film layer 2 are substantially equal to the corresponding steps of the first embodiment and hence, the explanation of such steps is omitted, and the explanation is made with respect to only different points.

After forming the first resin film layer 2, for forming the second resin film layer 3, a glove base body 1 which is mounted on a glove manufacturing mold 5 is immersed into a resin liquid which is different from a resin liquid used for forming the first resin film layer 2.

Here, with respect to a mixing ratio (in terms of dry weight) of a resin liquid which is used for forming the second resin film layer 3 of this embodiment, 1 part by weight of a stabilizer (ABS), 1 part by weight of sulfur, 3 parts by weight of zinc white, 0.5 parts by weight of a vulcanization accelerator BZ, and 1 part by weight of a thickening agent (sodium polyacrylate) are mixed into 100 parts by weight of NBR latex. This resin liquid permeates into the glove base body 1 more easily than the resin liquid used for forming the first resin film layer 2 at the time of immersion.

An immersion depth of the glove base body 1, drying and vulcanizing time and the like are substantially equal to the corresponding conditions used in the first embodiment and hence, the explanation of these conditions is omitted.

In this embodiment, a mixing ratio of the resin liquid used for forming the second resin film layer 3 is not limited to the above-mentioned mixing ratio and can be suitably changed within the above-mentioned range of composition.

[Comparison Experiment]
(Comparison Object)

The above-mentioned glove according to the first embodiment, the above-mentioned glove according to the second embodiment, a comparison example 1 which is formed as a sample by a substantially same method as the first embodiment except for that the second resin film layer 3 is formed with an immersion depth of 5 mm shallower than at the time of forming the first resin film layer 2, and a comparison example 2 which is formed as a sample by a substantially same method as the second embodiment except for that the second resin film layer 3 is formed with immersion 5 mm shallower than at the time of forming the first resin film layer 2.

(Evaluation of Adhesive Strength)

To check an adhesive strength of a resin film of each manufactured glove, at a portion of the glove 7 cm away from a finger tip, the glove base body and the resin film are forcibly peeled off from each other, and a force which peels off the resin film and the glove base body from each other (hereinafter, referred to as "peeling-off strength") is measured by a tensile testing machine (ORIENTIC CORPORATION: TENSILON PTM-100, strip shape having 1-inch width).

(Result of Experiment)

The result of the measurement of the peeling-off strength is shown in Table 1.

TABLE 1

Result of peeling-off strength

| sample | peeling-off strength(N/inch) | result |
|---|---|---|
| first embodiment | peeling impossible | excellent |
| second embodiment | peeling impossible | excellent |
| comparison example 1 | 14N | bad |
| comparison example 2 | 15N | bad |

When two resin films are formed using the same resin liquid and the second resin film layer is formed by immersing the glove base body 5 mm deeper than at the time of forming the first resin film layer as in the case of the first embodiment, due to drying of the coagulation liquid, the resin liquid deeply permeates into the glove base body at a peripheral portion of the first resin film layer, that is, in the vicinity of the immersion boundary so that the peeling-off strength is increased to a level that the peeling-off strength is unmeasurable.

Also when the resin liquid for forming the second resin film layer is prepared such that the second resin film layer permeates into the glove base body more easily than the resin liquid for forming the first resin film layer as in the case of the second embodiment, in the vicinity of the immersion boundary, the resin liquid permeates into the glove base body deeply in the same manner as the first embodiment so that the glove exhibits the large peeling-off strength.

To the contrary, in the comparison examples 1 and 2 where the second resin film layer is formed by immersing the glove base body into the resin liquid shallower than at the time of forming the first resin film layer, the peeling-off strength of the rein film is small so that the resin is liable to be peeled off from the fibrous glove.

As has been explained heretofore, in the gloves according to the first and second embodiments, in forming the second resin film layer, the glove base body is immersed into the resin liquid more deeply than at the time of forming the first resin film layer so that the resin liquid in the vicinity of the peripheral portion of the second resin film layer permeates into the glove base body deeply whereby the adhesive strength in the immersion boundary between the glove base body and the resin film can be increased. In this manner, by increasing the adhesive strength only at the immersion boundary, it is possible to enhance the durability of the glove while maintaining the soft texture of the whole glove.

Third Embodiment

Figure 5:
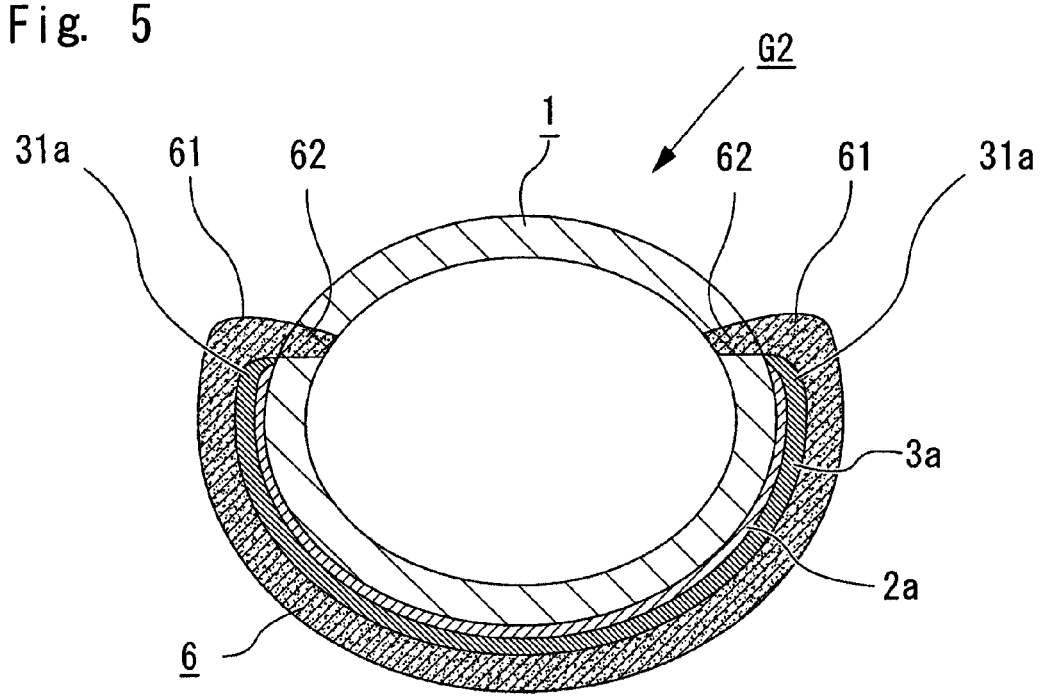
FIG. 5 is an explanatory enlarged cross-sectional view showing a finger portion of the glove according to a third embodiment which includes a third resin film layer.

FIG. 5 is an explanatory enlarged cross-sectional view showing a finger portion of a glove (G2) according to a third embodiment which includes a third resin film layer, and the third embodiment of the present invention is explained in conjunction with FIG. 5.

A glove G2 includes a first resin film layer 2a which is formed on a surface of a glove base body 1, a second resin film layer 3a which is formed on the first resin film layer 2a, and a third resin film layer 6 which is formed on the second resin film layer 3a in an overlapping manner.

Since the manner of operation of the glove G2 is substantially equal to the corresponding manner of operation of the glove G, the detailed explanation of the manner of operation of the glove G2 is omitted.

Further, the first resin film layer 2a of the glove G2 has the same structure as the first resin film layer 2 of the glove G (the resin liquid does not deeply permeates into the glove base body 1 to an extent that the resin liquid reaches a rear side of the glove base body 1) and hence, the detailed explanation of the first resin film layer 2a is omitted.

The second resin film layer 3a of the glove G2 is formed on the first resin film layer 2a in an overlapping manner and, at the same time, a peripheral portion 31a of the second resin film layer 3a extends beyond a peripheral portion of the first resin film layer and is brought into direct contact with the glove base body 1. However, the resin liquid which is brought into contact with the glove base body 1 does not permeate into the inside of the glove base body 1.

The third resin film layer 6 is formed over the first resin film layer 2a and the second resin film layer 3a in an overlapping manner and, at the same time, a peripheral portion 61 of the third resin film layer 6 extends beyond the peripheral portion 31a of the second resin film layer and is brought into direct contact with the glove base body 1, and the resin liquid which is brought into contact with the glove base body 1 permeates into the inside of the glove base body 1 thus forming a peeling-off preventing portion 62.

Further, in the glove G2, the whole peripheral portion 61 of the third resin film layer 6 extends beyond the peripheral portion 31a of the second resin film layer and is brought into direct contact with the glove base body 1, and the resin liquid which is brought into contact with the glove base body 1 permeates into the inside of the glove base body 1 thus forming the peeling-off preventing portion 62. However, the third embodiment is not limited to such a constitution, and the third embodiment may have the following constitution. For example, in a portion where the resin film is particularly liable to be peeled off (the portion being different depending on a content of an operation) or in an area in the vicinity of the portion including the portion, the peripheral portion 61 which constitute a portion of the third resin film layer 6 may extend beyond the peripheral portion 31a of the second resin film layer and may be brought into direct contact with the glove base body 1, and the resin liquid which is brought into contact with the glove base body 1 may permeate into the inside of the glove base body 1 thus forming the peeling-off preventing portion 62.

Fourth Embodiment

Figure 6:
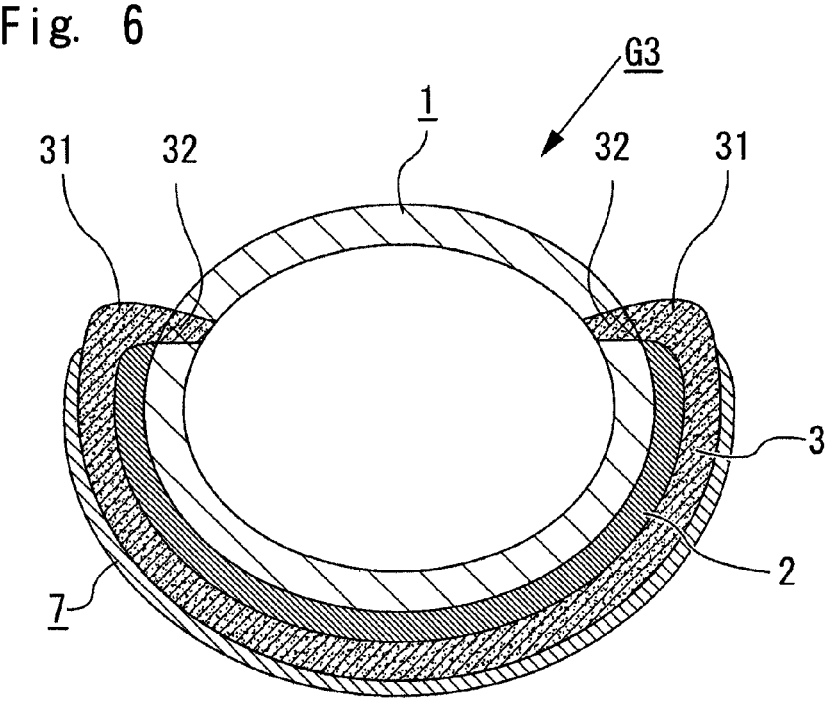
FIG. 6 is an explanatory enlarged cross-sectional view showing a finger portion of the glove according to a fourth embodiment which includes a third resin film layer.

FIG. 6 is an explanatory enlarged cross-sectional view showing a finger portion of the glove (G3) according to a fourth embodiment which includes a third resin film layer, and the fourth embodiment of the present invention is explained in conjunction with FIG. 6.

The glove G3 includes a first resin film layer 2 which is formed on a surface of a glove base body 1, a second resin film layer 3 which is formed on the first resin film layer 2, and a third resin film layer 7 which is formed on the second resin film layer 3 in an overlapping manner (that is, the third resin film layer 7 is formed on the glove G).

Different from the above-mentioned glove G2, in the glove G3, a peripheral portion 61 of the third resin film layer 7 does not extend beyond a peripheral portion 31 of the second resin film layer, and is not brought into direct contact with the glove base body 1.

The manner of operation of the glove G3 is substantially equal to the manner of operation of the glove G and hence, the detailed explanation of the manner of operation of the glove G3 is omitted.

Figure 7:
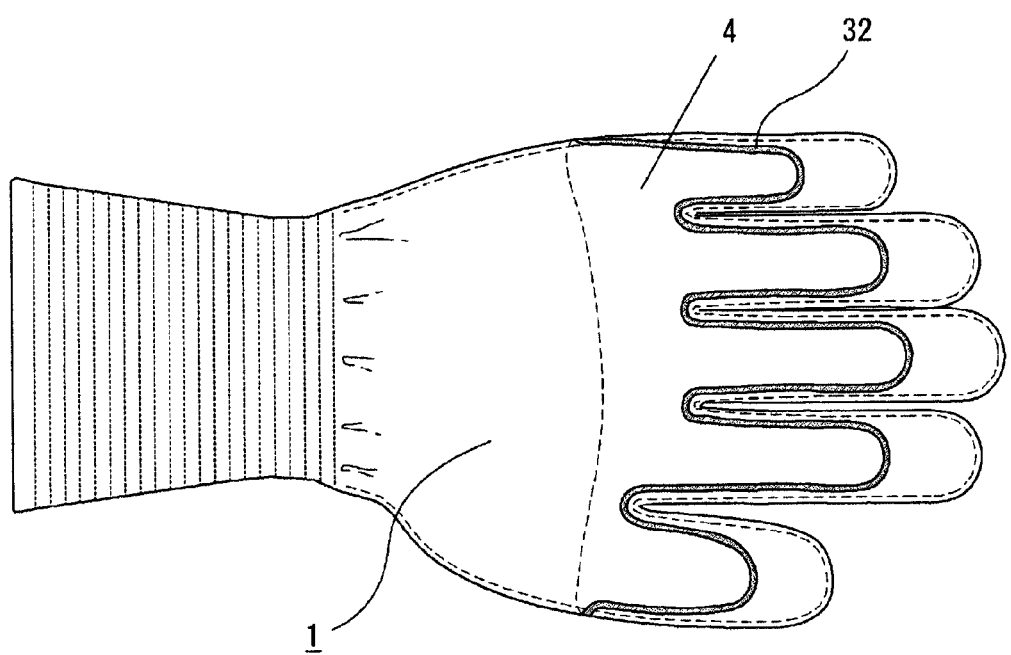
FIG. 7 is an explanatory plan view of a glove in an up-side-down posture in which a peeling-off preventing portion is formed only on a back side and side portions of each finger portion as viewed from a back side of the glove.

Further, in the gloves G, G2, G3 according to the first to fourth embodiments, the first resin film layer 2 and the second resin film layer 3 (including the third resin film 6, 7 with respect to the glove G2, G3) cover a palm portion and a side portion of the glove base body 1, a palm portion side and side portions of each finger portion, and a portion ranging from a finger tip portion to a back side of each finger portion while including the finger tip portion. However, a portion to be covered is not limited to the above-mentioned mode. For example, as shown in FIG. 7, the peeling-off preventing portion may be formed only on a back side and a side portion of each finger portion of the glove. In the glove shown in FIG. 7, different from the glove shown in FIG. 3, the peeling-off preventing portion where the resin liquid permeates into the inside of the glove base body 1 is not formed on a back side portion of the glove base body (see FIG. 7).

In general, in an exacting or fine operation using fingertips such as assembling of a household electrical appliance or mechanical parts or handling of an agricultural machine, for example, a periphery of a finger is extended or shrunken so that a peripheral portion of the resin film layer adhered to the glove base body (particularly, a portion of the resin film layer in an immersion boundary at knuckles and crotch portions between fingers) is liable to be peeled off. However, the glove according to the present invention includes the peeling-off preventing portion and hence, the peripheral portion of the resin film layer is not peeled off or is hardly peeled off also in the above-mentioned operation (see FIG. 2).

Here, in the above-mentioned operation in which a wearer mainly uses his fingertips, a load is not particularly applied to a back side of the glove so that the peripheral portion of the resin film layer is hardly peeled off. Accordingly, the peeling-off preventing portion may be formed only on the peripheral portions of the finger portions where the resin film layer is liable to be peeled off as in the case of the glove shown in FIG. 7.

Further, the portion on which the peeling-off preventing portion is formed is not particularly limited, and the portion on which the peeling-off preventing portion is formed may adopt various shapes and modes.

In the gloves according to the first, second and third embodiments, the resin liquid corresponding to the distal end of the peripheral portion of the resin film layer which is arranged on an outermost side (that is, the peeling-off preventing portion 32 of the glove shown in FIG. 2 and the peeling-off preventing portion 62 of the glove shown in FIG. 5) deeply permeates into the glove base body. This mode is preferable from a viewpoint of the prevention of the peeling-off.

However, the glove is not limited to the above-mentioned mode. For example, in a glove which includes a plurality of, that is, three or more resin film layers, provided that a resin liquid corresponding to a peripheral portion of an intermediately arranged resin film layer (for example, the second resin film layer 3 of the glove shown in FIG. 6) deeply permeates into the glove base body and can prevent the peeling-off of the resin film layer, a resin film layer (for example, the third resin film layer 7 of the glove shown in FIG. 6) positioned outside the intermediately arranged resin film layer may be formed such that a resin liquid corresponding to the whole peripheral portion of the resin film layer deeply permeate into the glove base body or a resin liquid corresponding to a portion of the peripheral portion of the resin film layer deeply permeates into the glove base body.

Here, terms and expressions which are used in this specification are used exclusively for the explanation of the present invention and are not limited in any case, and there is no intent to exclude terms and expressions equivalent to features and parts of the features described in this specifications. Further, it is needless to say that various modifications are conceivable within the technical concept of the present invention.

INDUSTRIAL APPLICABILITY (1) According to the glove of the present invention, the glove includes resin film layers at least in two layers consisting of: the first resin film layer which is formed on the glove base body; and the second resin film layer which is formed on the first resin film layer in an overlapping manner and has a peripheral portion thereof extended beyond a peripheral portion of the first resin film layer and formed on the glove base body, and the peripheral portion of the second resin film layer includes the peeling-off preventing portion which is formed using the resin which permeates into the inside of the glove base body. Accordingly, the adhesive strength of the portion in the vicinity of the immersion boundary where the second resin film layer is most liable to be peeled off is enhanced due to the peeling-off preventing portion thus enhancing the durability of the glove.

Further, the resin which is used for forming the first resin film layer permeates into the glove base body in smaller quantity compared to the resin used for forming the peeling-off preventing portion. That is, in the portion other than the immersion boundary, the first resin film layer does not permeate into the glove base body to an extent that the peeling-off preventing portion permeates into the glove base body and hence, the glove exhibits the soft texture as the whole whereby the glove can ensure the flexibility of the glove per se.

Accordingly, the present invention can acquire the glove which can ensure the flexibility of the glove per se and can prevent the peeling-off of the resin film formed on the surface of the glove base body.

(2) Further, according to the manufacturing method of the glove, the adhesive strength of the portion in the vicinity of the immersion boundary where the resin film layer is most liable to be peeled off is enhanced due to the peeling-off preventing portion which is formed of the resin which permeates into the inside of the glove base body thus enhancing the durability of the glove. Further, in the portion other than the immersion boundary, the first resin film layer does not permeate into the glove base body to an extent that the peeling-off preventing portion permeates into the glove base body and hence, the glove exhibits the soft texture as the whole whereby the glove can ensure the flexibility of the glove per se.

Accordingly, the present invention can manufacture the glove which can ensure the flexibility of the glove per se and can prevent the peeling-off of the resin film formed on the surface of the glove base body.

In carrying out the above-mentioned manufacturing method, it is possible to omit an operation step in which a water repellant agent and a permeation agent are sprayed to the immersion boundary between the glove base body and the resin.

The invention claimed is:

1. A glove in which a resin film is formed on a palm side of a fibrous glove base body and the glove has a portion where the resin film is not formed on a back side of the fibrous glove base body so as to ensure flexibility of the glove and prevent the peeling-off of the resin that is formed on fibrous glove base body, wherein the glove includes resin film layers at least in two layers consisting of: a first resin film layer which is formed on the fibrous glove base body; and a second resin film layer which is formed on the first resin film layer in an overlapping manner and has a peripheral portion thereof extended beyond a peripheral portion of the first resin film layer and formed on the fibrous glove base body, and the peripheral portion of the second resin film layer includes a peeling-off preventing portion which is formed using a resin extending into the fibrous glove base body at an immersion depth therewithin that is larger than an immersion depth of the resin comprising the first resin film layer into the glove base body so that the second resin film layer peripheral portion continuously forms the peeling-off-preventing portion in order to contact and extend through the glove base body throughout a width thereof so that a distal end, relative to the back side of the fibrous glove base body, of the peeling-off preventing portion extends to an inner back side surface of the back side of the glove base body that is adjacent an opposing outer back side surface of the back side of the fibrous glove base body where resin film is not formed, the peeling-off preventing portion being formed over an entirety of the peripheral portion of the second resin film layer.

2. A glove in which a resin film is formed on a palm side of a fibrous glove base body and the glove has a portion where the resin film is not formed on a back side of the fibrous glove base body so as to ensure flexibility of the glove and prevent the peeling-off of the resin that is formed on fibrous glove base body, wherein the glove includes one or a plurality of resin film layers which are formed on the fibrous glove base body and an uppermost resin film layer which is formed on the resin film layers in a stacked manner and has a peripheral portion thereof extended beyond a peripheral portion of said one or plurality of resin film layers and formed on the fibrous glove base body, and the peripheral portion of the uppermost resin film layer includes a peeling-off preventing portion which is formed using a resin extending into the fibrous glove base body at an immersion depth therewithin that is larger than an immersion depth of another of the plurality of resin film layers into the fibrous glove base body so that the uppermost resin film layer peripheral portion continuously forms the peeling-off-preventing portion in order to contact and extend through the fibrous glove base body throughout a width thereof so that a distal end, relative to the back side of the fibrous glove base body, of the peeling-off preventing portion extends to an inner back side surface of the back side of the glove base body that is adjacent an opposing outer back side surface of the back side of the fibrous glove base body where resin film is not formed, the peeling-off preventing portion being formed over an entirety of the peripheral portion of the second resin film layer.

3. The glove according to claim 1 or 2, wherein a resin film layer is respectively formed on the second resin film layer or on the uppermost resin film layer.

4. A manufacturing method of a glove in which a resin film is formed on a palm side of a fibrous glove base body and the glove has a portion where the resin film is not formed on a back side of the fibrous glove base body so as to ensure flexibility of the glove and prevent the peeling-off of the resin that is formed on the fibrous glove base body, the manufacturing method comprising the steps of:

forming a first resin film layer on the fibrous glove base body; and forming a second resin film layer at least in one layer on the first resin film layer, wherein in the step of forming the second resin film layer, the fibrous glove base body is immersed into a resin liquid such that a peripheral portion of the second resin film layer extends beyond a peripheral portion of the first resin film layer and is brought into direct contact with the fibrous glove base body, and the resin liquid which is brought into direct contact with the fibrous glove base body by immersion permeates into the inside of the fibrous glove base body so that the resin liquid of the second resin film layer extends throughout a width of the fibrous glove base body to an inner back side surface of the back side of the fibrous glove body that is adjacent and opposite to an external back side surface of the back side of the fibrous glove body, thus forming a peeling-off preventing portion.

5. The manufacturing method of a glove according to claim 4, wherein in the step of forming the second resin film layer, drying of a coagulation liquid for forming the second resin film layer progresses faster than in the step of forming the first resin film layer or the resin liquid which permeates into the fibrous glove base body more easily than a resin liquid for forming the first resin film layer is used.

6. A manufacturing method of a glove in which a resin film is formed on a palm side of a fibrous glove base body and the glove has a portion where the resin film is not formed on a back side of the fibrous glove base body, the manufacturing method comprising the steps of: forming one or a plurality of resin film layers on the fibrous glove base body; and forming an uppermost resin film layer on the resin film layer or said one or plurality of resin film layers in a stacked manner such that a peripheral portion of the uppermost resin film layer extends beyond a peripheral portion of said one or plurality of resin film layers and is formed on the fibrous glove base body, wherein in the step of forming the uppermost resin film layer, the fibrous glove base body is immersed in a resin liquid such that the peripheral portion of the uppermost resin film layer extends beyond the peripheral portion of said one or plurality of resin film layers and is brought into direct contact with the fibrous glove base body, and the resin liquid which is brought into contact with the fibrous glove base body by immersion permeates into the inside of the fibrous glove base body thus forming a peeling-off preventing portion.

7. The manufacturing method of a glove according to claim 6, wherein in the step of forming the uppermost resin film layer, drying of a coagulation liquid for forming the uppermost resin film layer progresses faster than in the step of forming one or a plurality of resin film layers or the resin liquid which permeates into the fibrous glove base body more easily than a resin liquid for forming said one or plurality of resin film layers is used.

* * * * *